2,838,512
PREPARATION OF CYANURIC CHLORIDE

Marcel Teysseire and Hans Peter Sieber, Visp, Switzerland, assignors to Lonza Electrical and Chemical Works Ltd., Basel, Switzerland No Drawing. Application June 7, 1956
Serial No. 589,877

Claims priority, application Switzerland June 10, 1955

6 Claims. (Cl. 260—248)

The invention relates to the preparation of cyanuric chloride.

Cyanuric chloride can be prepared by trimerization of cyanogen chloride in the liquid phase. For instance, a method has been described where cyanogen chloride has been trimerized in the presence of ethyl ether saturated with hydrogen chloride. The reaction is strongly exothermic, and if larger amounts of cyanogen chloride are employed, the rapid rise of temperature may lead to explosions. In order to control the reaction on a technical scale, it was carried out in solvent mixtures, for instance in mixtures of ethyl ether or dioxane, with toluene, carbon tetrachloride, or chloroform. However, all said solvents and mixtures thereof have a higher boiling point than cyanogen chloride (13.8° C.), so that due to the generated heat of reaction, a substantial portion of the cyanogen chloride and hydrogen chloride escape from the liquid phase.

Therefore, it has been proposed to retain the cyanogen chloride in the aforesaid solutions by operating below its boiling point or by forming a complex with boron fluoride, which complex is not volatilized at the reaction temperature. In the first case the trimerization proceeds very slowly and with reduced yields; in the second case, the process, which is quite difficult anyhow, is further complicated by the use of the very poisonous boron fluoride.

It is a principal object of the invention to provide a very simple and economic procedure, which avoids the recited difficulties and allows of preparing cyanuric chloride of high purity at a satisfactory rate.

Other objects and advantages will be apparent from a consideration of the specification and claims.

We have found that the trimerization of cyanogen chloride is carried out with particular advantage in a dimethyl ether solution containing hydrogen chloride, whereby the content of hydrogen chloride is preferably at least 15 percent by weight.

A preferred embodiment of our invention consists in the use of an azeotropic mixture composed of 39% by weight of HCl ($b=-84°$ C.) and 61% by weight of dimethyl ether ($b=-23°$ C.), which mixture boils at $-2°$ C. (maximum boiling point). In the following specification and claims, we use the term "azeotropic mixture" as including mixtures in which the HCl content deviates up to about 10 percent from the exact azeotropic ratio.

The methyl ether-hydrogen chloride mixture, which will be called hereafter "reaction medium," presents particular properties which render it eminently suitable for the polymerization of the cyanogen chloride.

Over the whole mixing range, said reaction medium has a lower boiling point than cyanogen chloride, and it readily takes up, and gives off, heat. Irrespective of the large amount of heat developed by the polymerization of cyanogen chloride, it is therefore always possible to work at temperatures above 13° C., which are favorable to obtain a satisfactory rate of reaction, without risking undesirable loss of cyanogen chloride by evaporation from the liquid phase; at said temperatures, the reaction is carried out at slightly elevated pressures.

The hydrogen chloride content of the "reaction medium" which advantageously is at least 15% and preferably higher than 29%, favors the polymerization, the rate of which is strongly influenced by the HCl concentration.

A particular advantage of the reaction medium is that the monomeric cyanogen chloride is readily dissolved therein, while cyanuric chloride is difficultly soluble. Especially in cold solution, the latter precipitates in fine, readily filtered form.

As the azeotropic hydrogen chloride-dimethyl ether combines a substantial hydrogen chloride content with a relatively high maximum boiling point, which, however, is still below the boiling point of the cyanogen chloride, the reaction can be carried out at only slightly increased pressures, even at the relatively high temperatures of 20 to 50° C.

The reaction may be carried out at atmospheric or elevated pressures within a wide temperature range. The upper temperature limit is defined by the temperature at which the dimethyl ether-hydrogen chloride mixture starts decomposing to a notable extent into methyl chloride and water. Downwardly, the temperature range is limited only by the decrease of the reaction rate to a speed which is too low for commercial purposes.

Generally, the pressure will be maintained below 10 atm. and the reaction temperature will be maintained between $-15$ and 100° C., preferably in the range of $-4$ and 50° C.

The cyanogen chloride may be added to the reaction medium all at once, or it may be gradually introduced. The weight ratio of cyanogen chloride to reaction medium should be in the range of about 1:0.2 to 1:10, preferably 1:0.8 to 1:2.5.

It is essential for the successful performance of the method that the developed heat of reaction is rapidly carried off to prevent undesired side reactions. For instance, in a preferred embodiment of the invention, the reaction is carried out with refluxing and the heat of reaction is removed from the reaction space by the cooled reflux condenser. As the boiling point of the reaction medium is below that of the cyanogen chloride, the latter remains in the liquid phase, while the heat is carried off from the liquid phase by evaporation of a part of the reaction medium.

A further advantage of the use of approximately azeotropic hydrogen chloride-dimethyl ether mixtures is that on evaporation of the reaction medium no substantial disproportioning of its composition can take place. Therefore, uniform reaction conditions are automatically maintained, which is essential for the production of a pure end product.

The evaporation of the cyanogen chloride from the liquid phase is also essentially prevented when the heat is carried off by indirect means, for instance by means of a cooling coil placed in the reaction medium.

The obtained cyanuric chloride can be separated from the reaction medium continuously or discontinuously in the conventional manner by filtration or distillation.

The reaction medium may be prepared in various ways, for instance by passing hydrogen chloride into liquid dimethyl ether. Another convenient method consists in passing a mixture of hydrogen chloride gas and dimethyl ether vapor through a cooler in approximately the required ratio to obtain the azeotropic composition of the reaction medium, and in adjusting the temperature of the cooler so as to condense the mixture.

As set forth above, the method of the invention presents a number of considerable advantages over the known trimerization methods of cyanogen chloride. In the first place, the operation is much simpler because it is not necessary to employ additional diluents or complex forming agents. The heat of reaction can be simply, rapidly and completely removed. The particular reaction medium does not only allow of an easy control of the reaction but acts also as a selective catalyst, whereby side reactions are substantially prevented and an end product of commercial purity is obtained.

Finally, cyanuric chloride is obtained on a commercial scale in high yields of at least 80 percent, mostly of more than 90 percent of the cyanogen chloride.

The following examples are given to illustrate the method of the invention, it being understood that they are not intended to limit the scope of the invention in any way.

All parts are given by weight unless indicated otherwise.

*Example 1*

25 parts of an azeotropic hydrogen chloride-dimethyl ether mixture were introduced into a glass flask, fitted with a stirrer, a thermometer, a tube reaching nearly to the bottom of the flask, and a reflux condenser, while the latter was cooled by means of a suitable cooling medium to a temperature below —2° C. When the cooling was discontinued, the mixture started boiling at —2° C. Then 25 parts of gaseous cyanogen chloride were slowly introduced through said tube, whereby the temperature remained constant at —2° C. After 65 minutes, cyanuric chloride began to precipitate. The precipitate was filtered and washed with petroleum ether. 20 parts of cyanuric chloride were obtained having a melting point of 142–144° C. The yield was 80 percent.

*Example 2*

2200 parts of the azeotropic mixture and 2040 parts of cyanogen chloride were placed in an enameled vessel fitted with a stirrer and a reflux condenser; the vessel was closed against the atmosphere and cooled. In addition to the heat of polymerization, heat was supplied from the outside by means of a water bath, the temperature of which was not allowed to exceed 30° C. By vaporization of the azeotropic mixture and condensation in the reflux condenser, which was operating with cooling water of 9° C., the temperature in the vessel was kept constant at 20° C. After 4 hours, the system was cooled to —40° C., and the azeotropic mixture was decanted over a filter. As residue, there remained a raw product in the amount of 1980 g. (97%) with a melting point of 143 to 144° C., which was converted by sublimation into a pure product of a melting point of 145–146° C. The yield of sublimatable cyanuric chloride was 1844 g. (90.5%). If the cyanuric chloride, which had remained in the solution, was also recovered, the yield of raw product increased to 99.8%.

*Example 3*

The apparatus described in Example 2 was filled with 1960 parts of a mixture consisting of 55 percent by weight of HCl and 45 percent of dimethyl ether, and with 3320 parts of cyanogen chloride. After the system had been allowed to react at 20° C. for 4 hours, it was cooled down to —4° C., and the vessel was connected with a receiver through a cooler cooled by a freezing solution. By heating on a water bath, the reaction medium was distilled off under normal pressure. The residue remaining in the vessel was 3150 parts of raw cyanuric chloride in a yield of 95 percent.

After washing with petroleum ether and sublimation, said raw product yielded 3000 parts of a cyanuric chloride of 99.2 percent purity.

*Example 4*

9 parts of cyanogen chloride and the same volume of a mixture consisting of 30% by weight of HCl and 70% by weight of dimethyl ether were sealed in a glass tube and heated in a water bath at 40° C. After 10 minutes, cyanuric chloride began to precipitate in fine large crystals.

The next day, the tube was cooled and opened. The reaction medium was distilled off, and the residue was washed on a filter with petroleum ether. After drying, 8.15 parts of cyanuric chloride of a melting point of 144–145° C. were obtained.

We claim:

1. A method of preparing cyanuric chloride comprising dissolving cyanogen chloride in dimethyl ether containing hydrogen chloride in catalytically effective concentration, allowing said cyanogen chloride to polymerize in said solution, whereby the heat of polymerization vaporizes a hydrogen chloride-dimethyl ether azeotrope at a boiling point below the boiling point of the cyanogen chloride, maintaining the hydrogen chloride concentration of the solution essentially constant during polymerization, and separating the formed cyanuric chloride from said solution.

2. A method of preparing cyanuric chloride comprising dissolving cyanogen chloride in dimethy ether containing at least 15 percent by weight of hydrogen chloride, allowing said cyanogen chloride to polymerize in said solution, whereby the heat of polymerization vaporizes a hydrogen chloride-dimethyl ether azeotrope at a boiling point below the boiling point of the cyanogen chloride, maintaining the hydrogen chloride concentration of the solution essentially constant during polymerization, and separating the formed cyanuric chloride from said solution.

3. The method as defined in claim 2, wherein the polymerization of the cyanogen chloride is carried out at temperatures of —14 and +100° C.

4. The method as defined in claim 2 wherein said solution is refluxed during polymerization.

5. A method of preparing cyanuric chloride comprising dissolving cyanogen chloride in a liquid mixture of dimethyl ether and hydrogen chloride, the composition of said mixture being substantially azeotropic and deviating from such azeotropic composition by not more than 10 percent, maintaining said solution at a temperature of —14 to 100° C. until said cyanogen chloride has substantially polymerized to cyanuric chloride, and separating said cyanuric chloride from said mixture.

6. A solution suitable to form cyanuric chloride comprising cyanogen chloride dissolved in a liquid mixture of dimethyl ether and hydrogen chloride, the composition of said mixture being substantially azeotropic and deviating from such azeotropic composition by not more than 10 percent, the weight ratio of cyanogen chloride and said mixture in said solution being about 1:0.2 to 1:10.

References Cited in the file of this patent

UNITED STATES PATENTS

| | | |
|---|---|---|
| 1,910,176 | Muller et al. | May 23, 1933 |
| 1,916,473 | Forrest et al. | July 4, 1933 |
| 2,007,510 | Thornton | July 9, 1935 |
| 2,104,023 | Clement | Jan. 4, 1938 |

OTHER REFERENCES

Ponomarew: Berichte der Deutschen Chemischen Gesselschaft, vol. 18, page 3262 (1885).

Hantzsch: Berichte der Deutschen Chemischen Gesselschaft, vol. 28, page 2472 (1895).

Official Gazette, vol. 544, pages 458, 459, Nov. 17, 1942.

Maass et al.: Journ. Am. Chem. Soc., vol. 34, pages 1281–1283 (1912).

Maass et al.: Journ. Am. Chem. Soc., vol. 35, pages 535–539 (1913).

Maass et al.: Journ. Am. Chem. Soc., vol. 45, pages 1675–1682 (1923).